Oct. 31, 1950 H. E. LUNDBERG 2,528,065
LIQUID-PERMEABLE TANK BOTTOM FOR BEDS
OF GRANULAR MATERIAL
Filed Jan. 22, 1948 4 Sheets-Sheet 1
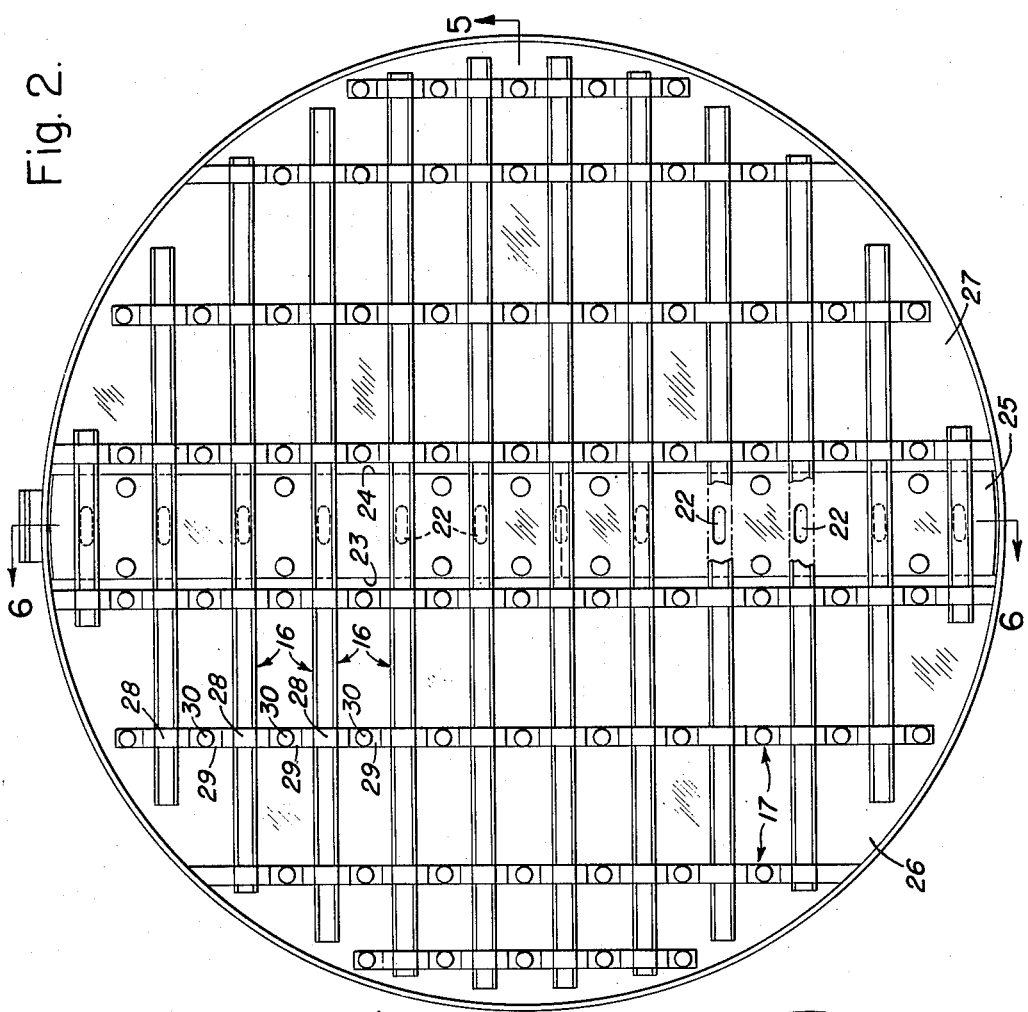
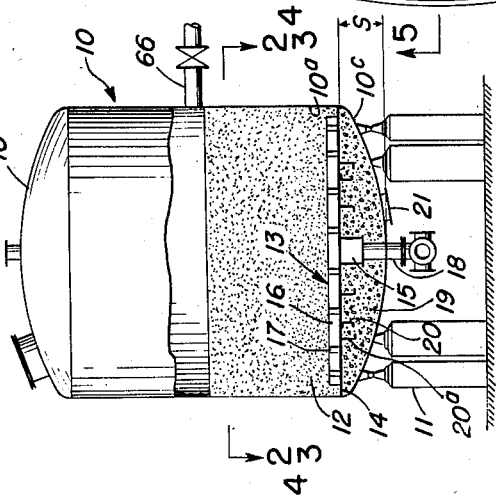
INVENTOR.
Harry E. Lundberg
BY
Arthur Middleton
ATTORNEY Oct. 31, 1950

H. E. LUNDBERG 2,528,065

LIQUID-PERMEABLE TANK BOTTOM FOR BEDS
OF GRANULAR MATERIAL

Filed Jan. 22, 1948

INVENTOR.
Harry E. Lundberg

BY

Arthur Middleton

ATTORNEY

Oct. 31, 1950  H. E. LUNDBERG  2,528,065
LIQUID-PERMEABLE TANK BOTTOM FOR BEDS
OF GRANULAR MATERIAL
Filed Jan. 22, 1948  4 Sheets-Sheet 3

INVENTOR.
Harry E. Lundberg
BY
ATTORNEY

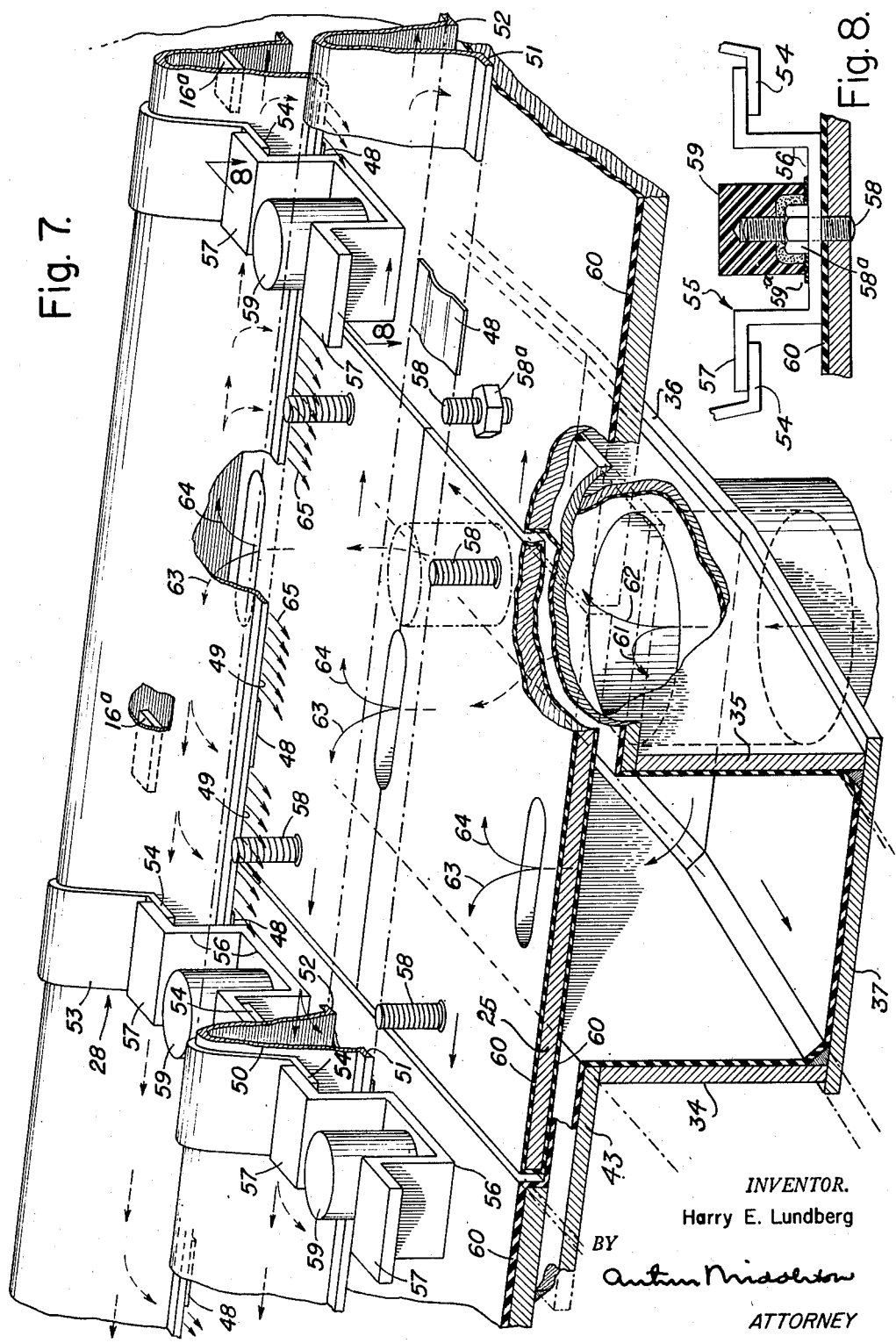

Patented Oct. 31, 1950

2,528,065

UNITED STATES PATENT OFFICE 2,528,065

LIQUID-PERMEABLE TANK BOTTOM FOR BEDS OF GRANULAR MATERIAL

Harry E. Lundberg, Brooklyn, N. Y., assignor to The Dorr Company, Stamford, Conn., a corporation of Delaware Application January 22, 1948, Serial No. 3,753

4 Claims. (Cl. 210—148)

This invention relates to apparatus for treating liquids, in which the liquid percolates through a bed of granular material contained in a tank. More specifically it relates to improvements in the structure for supporting the bed of material in the tank, that is a structure in the nature of a liquid-permeable false bottom or liquid-distributing supporting structure.

With respect to the bed-supporting and liquid-distributing structure in such apparatus it is a general problem that while liquid may pass upwardly or downwardly through the bed, granules or particles of the bed material should not escape downwardly through flow passages of the supporting structure. On the other hand the liquid permeating the structure, for instance upwardly, should be distributed by the structure as uniformly as possible with respect to the entire cross-sectional area of the bed. Yet it is desirable that the bed-supporting structure be compact in the sense that it should occupy only a minimum of vertical tank space in order to detract a minimum from the operative height of the tank as well as to minimize the volume of liquid which might be detained within or by the passages of the supporting structure itself. The importance of some of the more specific problems just mentioned will appear more clearly in the course of the subsequent description.

While the improvements in the bed-supporting and liquid-distributing structure of this invention may apply to plain filter operations with beds of granular filter material that is inert with respect to the liquid being filtered therethrough, the improved structure appears to be of special significance when applied to the operation of beds of granular contact material, that is material reacting chemically with the liquid or solution percolating through the bed.

An important application of the improved structure lies in its use for the operation of beds of granular ion exchange material, such materials being for example in the nature of organic or synthetic resinous materials variously also known as exchange resins or as organolites.

By way of example, the bed-supporting structure of this invention may be embodied in an apparatus adapted to serve for the purification treatment liquids through ion exchange whereby dissolved inorganic salts if ionized may be removed from a solution containing them. In this way, for example, sugar-bearing solutions or sugar juices may be freed of non-sugars or impurities represented by salts in solution, such as sulphates and chlorides found among others in naturally derived sugar juices.

Taking the case of purifying and de-ionizing beet sugar juice as an example, the sugar solution containing the dissolved and ionized salts or impurities is passed sequentially through a bed of cation exchange material and a bed of anion exchange material. The treatment unit containing the cation exchange material is herein also called a cation exchange cell or station, while the unit containing the anion exchange material is also termed an anion exchange cell or station.

The principle of the chemical mechanism per se of such deionizing or purification operation through ion exchange is well known. Briefly the cation exchange material having been loaded with exchangeable H-ions by regeneration or treatment with a strong mineral acid such as $H_2SO_4$ of a suitable concentration upon contact with the sugar juice takes up the cations of the ionized salt while releasing the molar equivalent of H-ions into the solution or juice and to that extent acidifying that solution. The thus acidified sugar juice then passes through the anion exchange material which has been previously regenerated by contact with an alkali such as $Na_2CO_3$ of a suitable strength. The thus conditioned anion exchange material upon contact with the acidified sugar juice adsorbs the acid previously induced in the juice and thus there passes from the bed a juice that is purified, that is freed of salts as well as substantially neutralized. The anion exchange material therefore is also termed an acid-adsorbing exchange material. Another interpretation is that the anion exchange material by regeneration becomes loaded with exchangeable OH-ions which are subsequently released into the sugar juice in exchange for the molar equivalent of the anions of the acid, so that as a net result the acid will have been replaced with the molar equivalent of pure water.

Certain crystallizable sugars, such as sucrose, contained in sugar juices tend to be changed to invert sugars in an acid medium whereby they lose the ability to crystallize. Where the objective is to obtain crystallized sugar as the end product following ionic purification of the sugar juice, it is desirable to minimize the time of detention of the juice in the acid phase that is temporarily induced in the juice due to the exchange of cations against H-ions, in order that inversion might be discouraged. The compactness of the bed-supporting structure according to this invention is a contributing factor in minimizing that detention.

In the case of ionic sugar juice purification it is important for several reasons that the flow of liquid be uniformly distributed throughout the cross-sectional area of the bed. One reason is that the bed should be progressively and uniformly exhausted in the direction of the flow of the juice through the bed. Another reason is that when displacing residual sugar juice or regenerant solution from the bed with water there should be as nearly as possible a volumetric displacement of the residual volume from the bed, that is the displacement should take place with a minimum of intermixing between the displacing volume of water and the respective volume of liquid that is being displaced by it. This illustrates the specific important of the improvements in the bed-supporting and liquid-distributing structure according to this invention.

In view of the foregoing objects, this invention provides a primary horizontal liquid-distributing channel extending diametrically at the underside of a bottom plate, and a plurality of secondary distributing channels disposed at the topside of the bottom plate and extending parallel to one another although transversely of the primary channel. The secondary channels are inverted and fastened directly to the top-side of the plate although in such a manner that their bottom edges are slightly spaced from the top face of the plate so as to provide narrow horizontal flow passages. The primary distributing channel communicates with the secondary distributing channels through a series of flow-passage or liquid-transfer openings in the bottom plate each of which is disposed under a respective inverted secondary channel.

Thus, according to a preferred embodiment of this invention, liquid fed to the intermediate portion of the primary channel may split to flow in opposite directions towards both ends of the primary channel. Divisional streams of liquid flow upwardly from the primary channel through the communicating or transfer openings into the intermediate portions of the respective secondary channels above the plate, each divisional stream splitting again to flow towards both ends of its secondary channels while further sub-dividing into divisional streams or sheets emerging through the horizontal narrow slot passages, that is in a final direction which is parallel to the flow direction in the primary channel although eventually upwardly into the bed of granular material above.

Some features lie in the manner of arranging and fastening the secondary channels upon the top-side of the bottom plate; other features lie in ways and means for acid-proofing the component parts of the bed-supporting and liquid-distributing structure; still other features lie in the manner of reinforcing the liquid-distributing structure or bottom plate against the load of the bed of granular material upon it.

According to one feature the secondary channels or channel members are detachably fastened to the top-side of the bottom plate by means of bridge or saddle members placed upon them, and clamping members interposed between adjoining channels and anchored to the bottom plate.

According to another feature the bottom plate is sectionalized, comprising a central diametrically extending section or strip or zone which is provided with the flow transfer passages or openings through which liquid may pass from the primary distributing channel at the under-side of the plate to the secondary distributing channel at the top-side of the plate.

According to another feature the space between the horizontal bottom plate or false bottom of the liquid-distributing structure and the tank bottom proper is filled with a mass of concrete in which the primary distributing channel may be embedded, whereby the false bottom is relieved of direct load strains from the weight of the bed of granular material upon it.

The invention possesses other objects and features of advantage, some of which with the foregoing will be set forth in the following description. In the following description and in the claims parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which Fig. 1 is a small scale diagrammatic side view of a tank with wall portions broken away to show the bed-supporting and liquid-distributing structure;

Fig. 2 is an enlarged plan view of the liquid-distributing structure less diagrammatic than the showing of Fig. 1, indicating particularly the disposition of the secondary distributing channels and the means for fastening them;

Fig. 3 is a small scale diagrammatic plan view merely showing the manner in which the bottom plate is sectionalized;

Fig. 7 is an enlarged partial sectional perspective view of the bed-supporting and liquid-distributing structure per se, with arrows indicating the course of the liquid from its entry into the primary channel through various directional changes and subdivisions to its exit from the secondary liquid-distributing members;

Fig. 8 is a detail sectional view of a portion of the fastening means for the secondary channel members.

Figure 4:
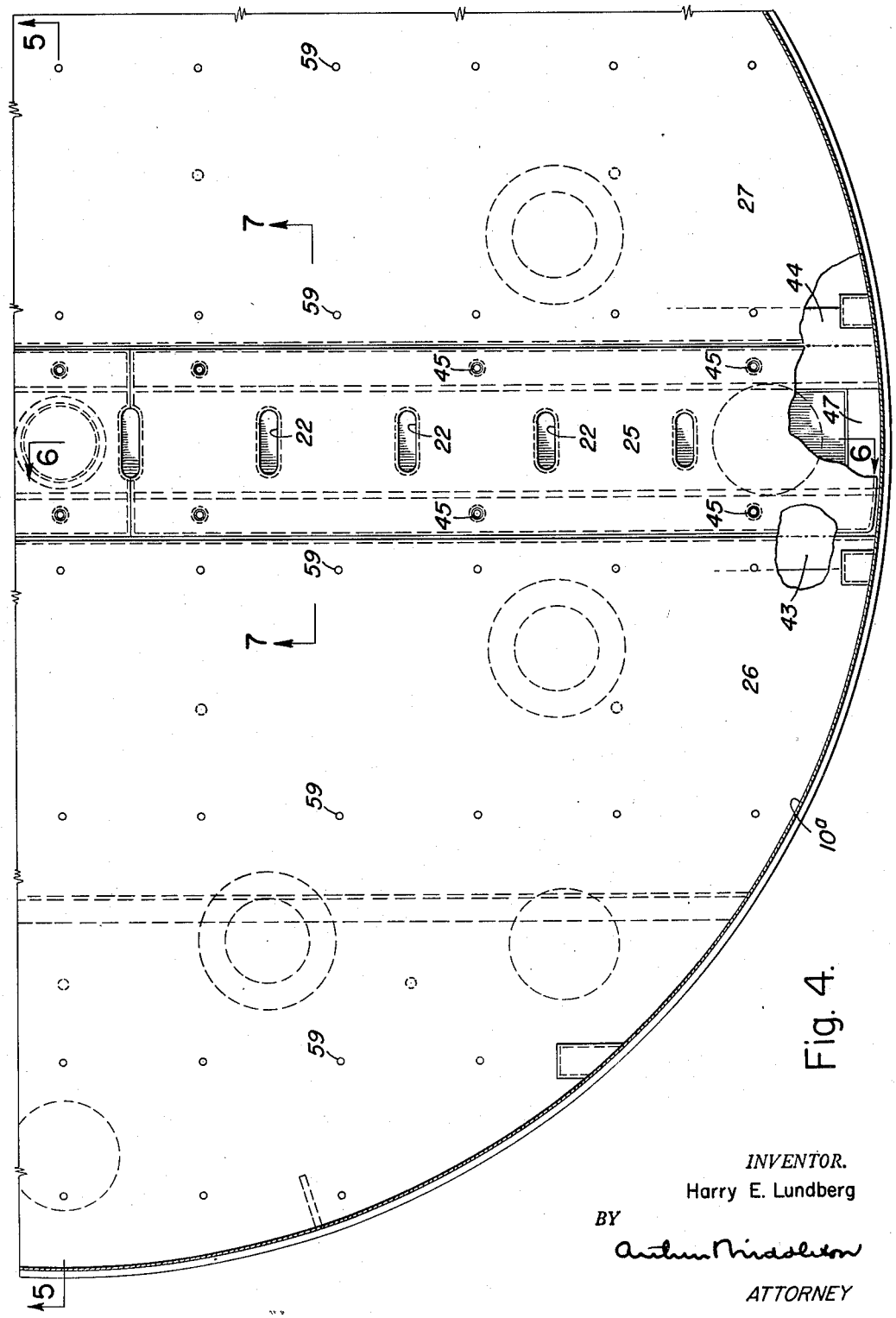
Fig. 4 is an enlarged and more detailed partial top view of the bottom plate with the secondary channel members removed but showing more details of the sections of the bottom plate, parts thereof being broken away to show the underlying primary distributing channel.

The tank or treatment cell containing what may be a bed of granular exchange material is shown diagrammatically in Fig. 1. That is, a tank 10 proper having a cylindrical wall portion 10$^a$, an upwardly curved top portion 10$^b$ and a downwardly curved bottom portion 10$^c$ is supported upon columns or legs 11, and shown with the wall portion partially broken away. This exposes a bed 12 of granular material resting upon a liquid-permeable bottom structure 13 rather diagrammatically shown although in it there may be distinguished a false bottom or horizontal bottom plate 14, a primary distributing channel 15 at the underside of the plate, secondary distributing channels 16 at the top of the plate extending transversely of the primary channel, fastening or clamping means 17 for attaching the secondary channels to the plate 14, and a supply or discharge connection 18 for the primary channel.

A space S between the horizontal bottom plate 14 and the tank bottom portion 10c is filled with concrete 19 embedding the primary channel as well as supporting the plate 14.

Anchoring and stiffening steel shapes 20 are fastened to the under-side of the plate 14 to be embedded in the concrete. Hook members 20a embedded in the concrete also extend downwardly from the under-side of the plate.

Closed manhole openings 21 or the like are indicated in the tank bottom 10c, through which concrete may be poured into the spaces.

A top view of the liquid-distributing structure in Fig. 2 shows more clearly, and less diagrammatically than Fig. 1 some of the details of the disposition of the secondary channel members 16, as well as of the means for fastening them to the bottom plate 14, and also the relationship of the secondary channel members 16 with respect to the primary channel 15. That is to say, a portion of some of the secondary channel members 16 are broken away to expose the corresponding liquid transfer openings 22 through which liquid enters from the primary channel underneath the plate into the secondary channels above the plate 14. One such opening 22 is disposed under each secondary channel at the intermediate portion thereof and is of an elongated form co-extensive with the underlying secondary channel.

The Fig. 2 view also indicates by the lines 23 and 24 how the bottom plate 14 is sectionalized in a manner which is even more clearly shown per se in the reduced scale view of Fig. 3. Accordingly the plate 14 comprises a diametrical strip-like middle section 25 overlying and co-extensive with the primary distributing channel 15 and provided with the liquid transfer openings 22 and herein also called the liquid transfer section of the bottom plate 14, and a pair of complementary or half-round sections 26 and 27.

Fig. 2 further indicates to some extent the fastening means 17 for anchoring or clamping the secondary channel members 16 to the top-side of the bottom plate 14, these fastening means comprising saddle members 28 placed upon or straddling the secondary channel members, as well as clamping members 29 interposed between respective channel members to engage and hold one end of each of a pair of saddle members, the clamping member itself being anchored to the bottom plate 14 as by bolt 30.

In Fig. 4 the middle plate section 25 overlies the primary channel which is partly visible because of a portion of middle plate section 25 being broken away, the middle plate section being face to face with longitudinal horizontal top flanges of the primary channel 15.

Figure 5:
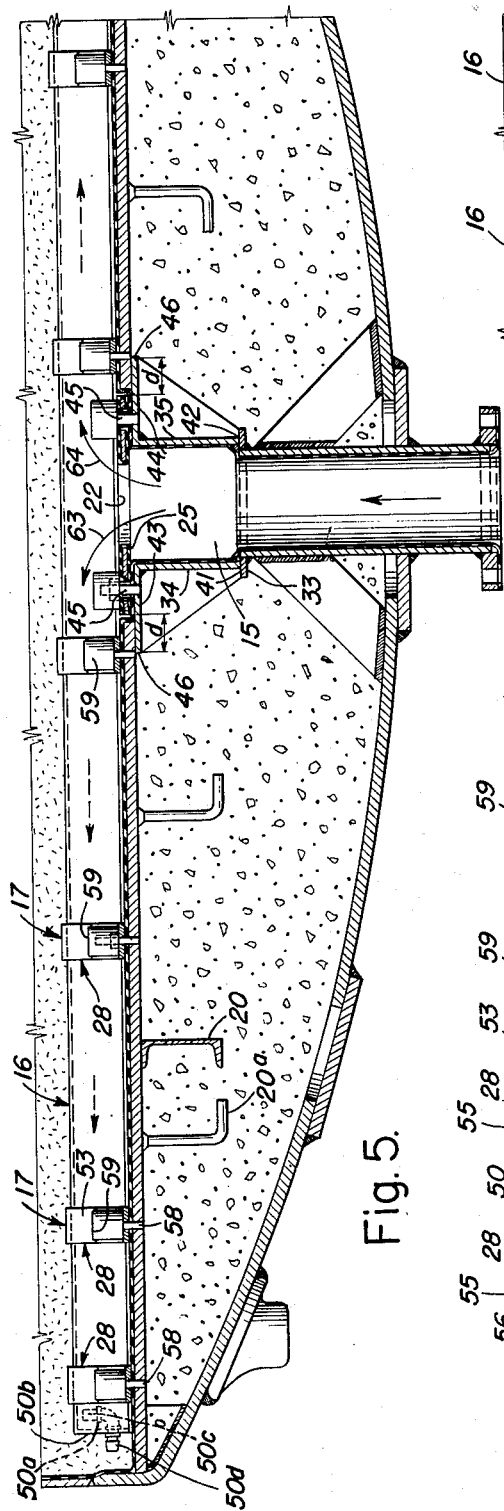
Fig. 5 is a section along the line 5—5 of Fig. 4 running across the primary channel although parallel to the secondary channel members.
Figure 6:
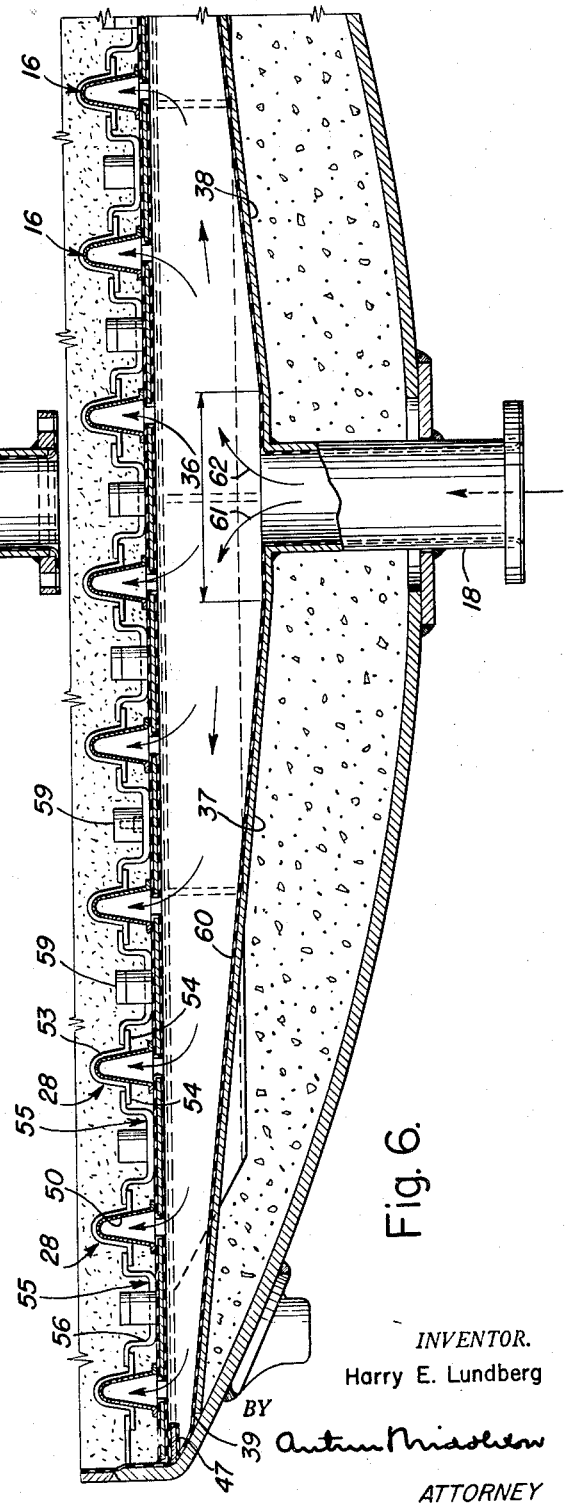
Fig. 6 is a section on the line 6—6 of Fig. 4 running longitudinally through the primary distributing channel, although transversely of the secondary distributing channels.

Figs. 5 and 6 being enlarged sectional detail views of the bottom portion of the tank show more clearly the manner in which the primary distributing channel 15 is connected or made unitary with the bottom plate 14. That is, the primary channel is of rectangular cross-section and comprises a bottom plate 33 and side walls or plates 34 and 35. The bottom of this channel has an intermediate lowest section 36 and shallow slightly inclined sections 37 and 38 rising towards the respective ends of the channel, the ends of the channel bottom plate merging into or being welded to the tank bottom as at 39. The side walls 34 and 35 are shown to be welded to the channel bottom as at 41 and 42, and have relatively wide horizontally extending top flanges 43 and 44 to which is fastened face to face the middle plate section as indicated by bolts 45. The flanges 43 and 44 extend a distance $d$ beyond the respective longitudinal edges of the middle plate section 25 and may be fastened to the underside of the adjoining edge portions of the plate sections 26 and 27 as by welding indicated at 46. Thus the underlying primary distributing channel in effect is integrated with and becomes a part of the plate 14, while the middle section 25 is removable. At each end the primary distributing channel has an inwardly overlying transverse flange portion 47 (see Figs. 4 and 6) in horizontal alignment with the flanges 43 and 44 of the primary channels. Thus there is in effect provided a continuous peripheral flange at the top edge of the primary distributing channel 15 upon which rests the middle plate section 25.

Referring to Figs. 5 and 6 and more particularly to the perspective view in Fig. 7, it will be seen that the secondary or overlying distributing channel members 16 are spaced from the top face of plate 14 by a series of relatively thin spacer plates or shims 48 which are disposed a suitable distance from one another. Thus there are established horizontal narrow flow passages or slots 49 the through-flow area of which is defined by the vertical spacing of the secondary channel members 16 from the bottom plate 14 and by the horizontal spacing of the shims 48 from one another.

The secondary distributing channel members 16 comprise an inverted V-shaped body portion 50 having its bottom edges formed with longitudinal flange portions 51 and 52 respectively spaced from the top face of the plate 14 by the shims 48. As a representative example Fig. 7 also shows that secondary channel members 16 are provided internally with horizontal stiffening ribs 16a interconnecting the shanks of the V-shape.

With respect to the fastening or clamping means 17, each of the saddle members 28 thereof comprises an inverted V-shaped body portion 53 substantially corresponding to and hugging a corresponding portion of the outer contour of a secondary channel member 16. A horizontal flange or tab 54 extends from each end of the body portion 53 at about half height of the associated secondary channel member.

A clamping member 55 of the fastening means 17 comprises a U-shaped body portion 56 provided with tabs 57 one such tab extending horizontally and outwardly from each vertical shank of the U-shape and overlying an adjoining tab 54 of a saddle member 28. An anchoring bolt 58 screwed into the plate 14 passes centrally through each clamping member 55 and has a nut 58a whereby the clamping member can be tightened down upon the associated tabs 54 of two adjoining saddle members 28. A protective cap 59 of acid-resisting material, for example a plastic having an internal thread, is screwed upon the exposed top end portion of bolt 58 so that the exposed nut and bolt portion will be tightly encased and the bottom edge of the cap through a washer 59a will close tightly against the clamp member 55. In fact where acid liquors or solutions are involved, as in the above referred to ion exchange purification operation, all parts of the structure which may come into contact with the acidified liquid being treated or with the regenerating acid should be rendered acid-resistant unless they consist of acid-proof material. An acid-resisting coating 60 as of rubber is indicated by a heavy cross-hatching of some of the sectioned parts in Fig. 7.

For each secondary channel member 50 there is indicated a vent exemplified in the form of a small vent tube 50$^a$ mounted in the end wall 50$^b$ of the channel member. This vent tube 50$^a$ has an inner vertical portion 50$^c$ terminating near the top of the member 50$^a$, and an outer portion 50$^d$ extending horizontally and disposed near the bottom plate of the tank.

By way of example, the operation of the liquid-distributing structure will now be described on the assumption of the liquid passing upwardly through the unit, the principle of the manner of distribution and of the flow paths of the liquid through the distributing structure being clearly shown by means of arrows in the perspective view of Fig. 7.

Therefore, referring to Fig. 7, the main or feed stream of liquid is assumed to flow upwardly through the inlet connection 13 into the primary distributing channel 15. Upon entering the primary channel 15 at a point intermediate the ends thereof this main stream splits up into half portions flowing horizontally in opposite directions towards the respective ends of the primary channel as is indicated by arrows 61 and 62. Each such half-stream as it passes through its portion of a primary channel 15 is subdivided into a plurality of divisional streams in that each such divisional stream flows upwardly or branches off upwardly through a liquid transfer opening 22, thus entering a corresponding overlying secondary distributing channel 16. A divisional stream upon entering a secondary channel at a point intermediate the ends of that channel splits into half portions flowing in opposite directions towards the closed ends of the channel as is indicated by arrows 63 and 64.

As the split-up or halves of the divisional streams pass through their respective half portions of the secondary channels 16 they undergo a final subdivision as the liquid discharges as indicated by arrows 65 in sheet-like form through the horizontal narrow slot openings 49 and in closest proximity or directly adjacent the face of the bottom plate 14.

The liquid thus distributed over the cross-sectional area of the bed at the very bottom thereof then rises through the bed 12 of granular material and may discharge at the top thereof as through an outlet 66.

It may be desirable to control the level of the liquid so that the bed be submerged and yet the liquid level be maintained close to the top of the bed. Where the tank is of the closed type such as shown in Fig. 1, such a level control may be obtained by controlling the relative pressure of air trapped in the top portion of the tank, that is in the free-board space above the bed, in such a manner that the liquid level is maintained close to the top of the bed, a control method and apparatus for effecting such a control being disclosed in the patent to Shafor No. 2,365,221.

I claim:

1. A liquid-distributing bottom structure for a tank comprising a bottom plate, a primary horizontal distributing channel having a primary channel member connected to the underside of said plate and extending substantially diametrically thereof so that a portion of said plate constitutes the top for said primary channel, a plurality of secondary distributing channels comprising inverted channel members extending parallel to one another and transversely of said primary channel and connected to the top side of said plate and disposed relative to said plate to provide between their bottom edges and said plate secondary liquid passages, said top portion of the primary channel having openings constituting primary communicating liquid passages between the primary channel and respective secondary channels, liquid inlet means connected with said primary channel member, and means for removably fastening said inverted channel members to said plate, so that a volume of liquid entering said primary channel member passes therealong and then in primary divisional streams upwardly through said primary passages into said secondary channels and therealong to be discharged therefrom laterally in secondary divisional streams adjacent to said plate through said secondary passages.

2. A liquid-distributing bottom structure having a primary channel member connected to the underside of said plate and extending substantially diametrically thereof so that a portion of said plate constitutes the top for said primary channel, a plurality of secondary distributing channels comprising inverted channel members extending parallel to one another and transversely of said primary channel and connected to the top side of said plate and disposed relative to said plate to provide between their bottom edges and said plate secondary liquid passages, said top portion of the primary channel having openings constituting primary communicating liquid passages, between the primary channel and respective secondary channels, liquid inlet means conected with said primary channel member, and means for removably fastening said inverted channel members to said plate, so that a volume of liquid entering said channel passes therealong and then in primary divisional streams upwardly through said primary passages into said secondary channels and therealong to be discharged therefrom laterally in secondary divisional streams adjacent to said plate through said secondary passages, said plate comprising a substantially diametrically extending intermediate section provided with said primary passages, and a complementary section at each side of said intermediate section, said primary channel comprising a primary channel member extending substantially diametrically of said plate and having a pair of longitudinal horizontal top flanges the outer marginal portions of which are connected to overlying marginal portions of respective complementary plate sections, said intermediate plate section overlying the inner marginal portions of said longitudinal flanges and is removably fastened thereto, said secondary channels comprising inverted channel members and means for removably fastening the same upon said plate.

3. A liquid-distributing bottom structure having a primary channel member connected to the underside of said plate and extending substantially diametrically thereof so that a portion of said plate constitutes the top for said primary channel, a plurality of secondary distributing channels comprising inverted channel members extending parallel to one another and transversely of said primary channel and connected to the top side of said plate and disposed relative to said plate to provide between their bottom edges and said plate secondary liquid passages, said top portion of the primary channel having openings constituting primary communicating liquid passages between the primary channel and respective secondary channels, liquid inlet means connected with said primary channel member, and means for removably fastening said inverted channel members to said plate, so that a volume of liquid entering said channel passes therealong and then in primary divisional streams upwardly through said primary passages into said secondary channels and therealong to be discharged therefrom laterally in secondary divisional streams adjacent to said plate through said secondary passages, said secondary channels comprising inverted channel members, means for spacing the bottom edges of said channel members from the top face of said plate whereby the space constitutes said first-mentioned openings, with the addition of means for removably fastening said channel members upon said plate comprising a saddle member placed upon each of a pair of secondary channel members adjacent one another, said saddle member having at each end an outwardly-extending terminal portion, and a U-shaped clamping member disposed between said pair of saddle members and having outwardly-extending terminal portions complementary to respective adjacent terminal portions of said saddle members and engaging thereon, means for anchoring said clamping member upon said plate, and additional clamping means for anchoring the two non-adjacent terminal portions of said pair of saddle members to said plate.

4. A liquid-distributing bottom structure having a primary channel member connected to the underside of said plate and extending substantially diametrically thereof so that a portion of said plate constitutes the top for said primary channel, a plurality of secondary distributing channels comprising inverted channel members extending parallel to one another and transversely of said primary channel and connected to the top side of said plate and disposed relative to said plate to provide between their bottom edges and said plate secondary liquid passages, said top portion of the primary channel having openings constituting primary communicating liquid passages between the primary channel and respective secondary channels, liquid inlet means connected with said primary channel member, and means for removably fastening said inverted channel members to said plate, so that a volume of liquid entering said channel passes therealong and then in primary divisional streams upwardly through said primary passages into said secondary channels and therealong to be discharged therefrom laterally in secondary divisional streams adjacent to said plate through said secondary passages, said secondary channels comprising inverted channel members, means for spacing the bottom edges of said channel members from the top face of said plate whereby the space constitutes said first-mentioned openings, with the addition of means for removably fastening said channel members upon said plate comprising a saddle member placed upon each of a pair of secondary channel members adjacent one another, said saddle member having at each end an outwardly extending terminal portion, and a U-shaped clamping member disposed between said pair of saddle members and having outwardly-extending terminal portions complementary to respective adjacent terminal portions of said saddle members and engaging thereon, a threaded bolt screwed into said plate and extending through the bottom portion of said U-shaped clamping member, a nut upon said bolt for tightening upon said clamping member and a cap screwed upon the extreme top end portion of said bolt so as to tighten against said clamping member and thereby encasing said nut as well as the top end portion of said bolt, and additional clamping means for anchoring the two non-adjacent terminal portions of said pair of saddle members to said plate.

HARRY E. LUNDBERG.

REFERENCES CITED

The following references are of record in the file of this patent:

UNITED STATES PATENTS

| Number | Name | Date |
|---|---|---|
| 260,714 | Strunz | July 4, 1882 |
| 473,011 | Moore | Apr. 19, 1892 |
| 524,155 | Williamson | Aug. 7, 1894 |
| 1,572,398 | Leopold | Feb. 9, 1926 |
| 1,698,079 | Wagner | Jan. 8, 1929 |
| 1,747,470 | Duden | Feb. 18, 1930 |
| 2,032,668 | Shock | Mar. 3, 1936 |
| 2,139,924 | Woodruff | Dec. 13, 1938 |
| 2,387,101 | Walker | Oct. 16, 1945 |

FOREIGN PATENTS

| Number | Country | Date |
|---|---|---|
| 646,476 | Germany | June 17, 1937 |